(12) United States Patent
Nguyen et al.

(10) Patent No.: US 12,484,869 B2
(45) Date of Patent: Dec. 2, 2025

(54) KALMAN FILTER FRAMEWORK TO ESTIMATE 3D INTRAFRACTION MOTION FROM 2D PROJECTION

(71) Applicant: SEETREAT PTY LTD, Greenwich (AU)

(72) Inventors: Doan Trang Nguyen, New South Wales (AU); Paul Keall, New South Wales (AU); Ricky O'Brien, New South Wales (AU)

(73) Assignee: SeeTreat PTY Ltd., Greenwich (AU)

( * ) Notice: Subject to any disclaimer, the term of this patent is extended or adjusted under 35 U.S.C. 154(b) by 334 days.

(21) Appl. No.: 18/251,341

(22) PCT Filed: Nov. 2, 2021

(86) PCT No.: PCT/IB2021/060107
§ 371 (c)(1),
(2) Date: May 1, 2023

(87) PCT Pub. No.: WO2022/097013
PCT Pub. Date: May 12, 2022

(65) Prior Publication Data
US 2023/0404504 A1    Dec. 21, 2023

Related U.S. Application Data

(60) Provisional application No. 63/109,898, filed on Nov. 5, 2020.

(51) Int. Cl.
*A61B 6/46* (2024.01)
*A61B 6/00* (2024.01)
(Continued)

(52) U.S. Cl.
CPC ............ *A61B 6/466* (2013.01); *A61B 6/5217* (2013.01); *A61B 6/5264* (2013.01);
(Continued)

(58) Field of Classification Search
CPC ......... G06T 7/0012; G06T 7/277; G06T 7/70; G06T 2207/10116; G06T 2207/30081;
(Continued)

(56) References Cited

U.S. PATENT DOCUMENTS 8,121,368 B2 *   2/2012   Wiersma ................. G06T 7/251
                                                                    382/128
8,170,319 B2 *   5/2012   Shukla ................. A61N 5/1049
                                                                    378/65
(Continued)

FOREIGN PATENT DOCUMENTS

WO    WO-2017130140 A1    8/2017
WO    WO-2018090141 A1    5/2018
WO    WO-2018161123 A1    9/2018

OTHER PUBLICATIONS

Nguyen, Doan Trang, et al. "A real-time IGRT method using a Kalman filter framework to extract 3D positions from 2D projections." Physics in Medicine & Biology 66.21, p. 214001 (Year: 2021).*

(Continued)

*Primary Examiner* — Scott A Rogers
(74) *Attorney, Agent, or Firm* — Schwegman Lundberg & Woessner, P.A.

(57) ABSTRACT

An iterative Kalman Filter method was developed to address the need for estimating randomly moving targets during cancer radiotherapy on a standard equipped linear accelerator. Extensive evaluation of this method using different treatment scenarios shows sub-mm accuracy and precision. In addition, the system and method allows the target (or surrogates of the target) to be monitored without the need of a learning arc, reducing additional imaging dose to the patient. In addition, the method and system performs robustly against imaging and segmentation noise.

8 Claims, 8 Drawing Sheets

(51) Int. Cl.
A61N 5/10 (2006.01)
G06T 7/00 (2017.01)
G06T 7/277 (2017.01)
G06T 7/70 (2017.01)

(52) U.S. Cl.
CPC ......... *A61N 5/1037* (2013.01); *A61N 5/1049* (2013.01); *A61N 5/1067* (2013.01); *G06T 7/0012* (2013.01); *G06T 7/277* (2017.01); *G06T 7/70* (2017.01); *A61B 2576/00* (2013.01); *G06T 2207/10116* (2013.01); *G06T 2207/30081* (2013.01)

(58) Field of Classification Search
CPC ..... A61B 6/466; A61B 6/5217; A61B 6/5264; A61B 2576/00; A61N 5/1037; A61N 5/1049; A61N 5/1067
See application file for complete search history.

(56) References Cited

U.S. PATENT DOCUMENTS

| | | | | |
|---|---|---|---|---|
| 8,396,270 | B2* | 3/2013 | Keall | A61N 5/1049 382/128 |
| 10,134,155 | B2* | 11/2018 | Lachaine | A61B 6/4085 |
| 11,376,446 | B2* | 7/2022 | Nguyen | A61N 5/1037 |
| 2011/0150274 | A1 | 6/2011 | Patwardhan et al. | |

OTHER PUBLICATIONS

Tehrani, Joubin Nasehi, et al. "Real-time estimation of prostate tumor rotation and translation with a kV imaging system based on an iterative closest point algorithm." Physics in Medicine & Biology 58.23, p. 8517 (Year: 2013).*
"European Application Serial No. 21888783.4, Extended European Search Report dated Jul. 10, 2024", (Jul. 10, 2024), 12 pgs.
Bertholet, Jenny, "Real-time intrafraction motion monitoring in external beam radiotherapy", Physics in medicine and biology 64.15, (2019), 15TR01.
"International Application Serial No. PCT/IB2021/060107, International Search Report dated Jan. 4, 2022", (Jan. 4, 2022), 5 pgs.
"International Application Serial No. PCT/IB2021/060107, Written Opinion dated Jan. 4, 2022", (Jan. 4, 2022), 6 pgs.
Ballhausen, H., et al., "Intra-fraction motion of the prostate is a random walk", Physics in Medicine & Biology 60.2, (2014), 549.
Castellanos, E., et al., "Raypilot—electromagnetic real-time positioning in radiotherapy of prostate cancer—initial clinical results", Radiother Oncol 103(suppl 1), (2012), S433.
Cho, Byungchul, et al., "Experimental investigation of a general real-time 3D target localization method using sequential kV imaging combined with respiratory monitoring", Physics in Medicine & Biology 57.22, (2012), 7395.
Chung, Hyekyun, et al., "Reconstruction of implanted marker trajectories from cone-beam CT projection images using interdimensional correlation modeling", Medical physics 43(8), (2016), 4643-4654.
Fallone, B. G., et al., "First MR images obtained during megavoltage photon irradiation from a prototype integrated linac-MR system", Medical physics 36.6, (2009), 2084-2088.
Hewson, Emily A., et al., "The accuracy and precision of the KIM motion monitoring system used in the multi-institutional TROG 15.01 Stereotactic Prostate Ablative Radiotherapy with KIM (SPARK) trial", Medical physics 46.11, (2019), 4725-4737.
Kalman, Rudolph Emil, "A new approach to linear filtering and prediction problems", Transactions of the ASME—Journal of Basic Engineering 82(Series D), (1960), 35-45.
Keall, P. J., et al., "Real-time 3d image guidance using a standard linac: Measured motion, accuracy, and precision of the first prospective clinical trial of kilovoltage intrafraction monitoring guided gating for prostate cancer radiation therapy", Int J Radiat Oncol Biol Phys 94(5), (2016), 1015-1021.
Keall, Paul, et al., "Stereotactic prostate adaptive radiotherapy utilising kilovoltage intrafraction monitoring: the TROG 15.01 SPARK trial", BMC cancer 17, (2017), 1-7.
Keall, Paul J., et al., "The first clinical treatment with kilovoltage intrafraction monitoring (KIM): a real-time image guidance method", Medical physics 42.1, (2015), 354-358.
King, Christopher R., et al., "Stereotactic body radiotherapy for localized prostate cancer: interim results of a prospective phase II clinical trial", International Journal of Radiation Oncology* Biology* Physics 73.4, (2009), 1043-1048.
Kitamura, Kei, et al., "Registration accuracy and possible migration of internal fiducial gold marker implanted in prostate and liver treated with real-time tumor-tracking radiation therapy (RTRT)", Radiotherapy and oncology 62.3, (2002), 274-281.
Kupelian, Patrick, et al., "Multi-institutional clinical experience with the Calypso System in localization and continuous, real-time monitoring of the prostate gland during external radiotherapy", International Journal of Radiation Oncology* Biology* Physics 67.4, (2007), 1088-1098.
Langen, Katja M., et al., "Observations on real-time prostate gland motion using electromagnetic tracking", International Journal of Radiation Oncology* Biology* Physics 71.4, (2008), 1084-1090.
Lovelock, D. Michael, et al., "Continuous monitoring and intrafraction target position correction during treatment improves target coverage for patients undergoing SBRT prostate therapy", International Journal of Radiation Oncology* Biology* Physics 91.3, (2015), 588-594.
Montanaro, Tim, et al., "A comparison of gantry-mounted x-ray-based real-time target tracking methods", Medical Physics 45.3, (2018), 1222-1232.
Nguyen, D., et al., "A Kalman Filter (KF) Framework for Real-Time Prostate Motion Tracking On a Standard-Equipped Linear Accelerator", Medical Physics. vol. 46. No. 6. 111 River St, Hoboken 07030-5774, NJ USA: Wiley, (2019).
Nguyen, Doan Trang, et al., "The first clinical implementation of a real-time six degree of freedom target tracking system during radiation therapy based on Kilovoltage Intrafraction Monitoring (KIM)", Radiotherapy and Oncology 123.1, (2017), 37-42.
Poulsen, Per Rugaard, et al., "A method to estimate mean position, motion magnitude, motion correlation, and trajectory of a tumor from cone-beam CT projections for image-guided radiotherapy", International Journal of Radiation Oncology* Biology* Physics 72.5, (2008), 1587-1596.
Poulsen, Per Rugaard, et al., "Real-time prostate trajectory estimation with a single imager in arc radiotherapy: a simulation study", Physics in Medicine & Biology 54.13, (2009), 4019.
Poulsen, Per Rugaard, et al., "Three-dimensional prostate position estimation with a single x-ray imager utilizing the spatial probability density", Physics in medicine & biology 53.16, (2008), 4331.
Raaymakers, Bas W., et al., "Integrating a 1.5 T MRI scanner with a 6 MV accelerator: proof of concept", Physics in Medicine & Biology 54.12, (2009), N229.
Robinson, Don, et al., "An evaluation of the Clarity 3D ultrasound system for prostate localization", Journal of applied clinical medical physics 13.4, (2012), 100-112.
Santanam, Lakshmi, et al., "Fiducial-based translational localization accuracy of electromagnetic tracking system and on-board kilovoltage imaging system", International Journal of Radiation Oncology* Biology* Physics 70.3, (2008), 892-899.
Sazawa, Ataru, et al., "Alternative approach in the treatment of adrenal metastasis with a real-time tracking radiotherapy in patients with hormone refractory prostate cancer", International journal of urology 16.4, (2009), 410-412.
Shieh, Chun-Chien, et al., "A Bayesian approach for three-dimensional markerless tumor tracking using kV imaging during lung radiotherapy", Physics in Medicine & Biology 62.8, (2017), 3065.
Shimizu, Shinichi, et al., "Use of an implanted marker and real-time tracking of the marker for the positioning of prostate and bladder (56) References Cited

OTHER PUBLICATIONS cancers", International Journal of Radiation Oncology* Biology* Physics 48.5, (2000), 1591-1597.
Shirato, Hiroki, et al., "Feasibility of insertion/implantation of 2.0-mm-diameter gold internal fiducial markers for precise setup and real-time tumor tracking in radiotherapy", International Journal of Radiation Oncology* Biology* Physics 56.1, (2003), 240-247.
Shirato, Hiroki, et al., "Physical aspects of a real-time tumor-tracking system for gated radiotherapy", International Journal of Radiation Oncology* Biology* Physics 48.4, (2000), 1187-1195.

* cited by examiner

KALMAN FILTER FRAMEWORK TO ESTIMATE 3D INTRAFRACTION MOTION FROM 2D PROJECTION

PRIORITY APPLICATIONS

This application is a U.S. National Stage Filing under 35 U.S.C. § 371 from International Application No. PCT/IB2021/060107, filed on Nov. 2, 2021, and published as WO2022/097013 on May 12, 2022, which claims the benefit of priority to U.S. Provisional Application No. 63/109,898, filed on Nov. 5, 2020; the benefit of priority of each of which is hereby claimed herein, and which applications and publication are hereby incorporated herein by reference in their entireties.

TECHNICAL FIELD

The invention is generally directed to a method for monitoring movement of a tumor on an organ during radiotherapy in order to assure accurate directing of radiation therapy towards the tumor.

BACKGROUND

In current radiation therapy, image guided radiation therapy (IGRT) is routinely applied at the start of treatment to align the target with its planned position. However, tumors in the thorax, abdomen and pelvis are not static during treatment. Hence, methods to monitor tumor motion during treatment are highly desirable, even more so with dose escalation and hypofractionation.

In the case of prostate cancer radiotherapy treatments, studies with electromagnetic transponders showed that the prostate can travel up to 15 mm during treatment (Langen et al. 2008). As prostate stereotactic body radiotherapy (SBRT) treatments become clinical standard, it is recommended that real-time motion monitoring is used during these high dose treatments to ensure the dose delivered faithfully reflects the treatment plan (Lovelock et al. 2014). A number of different intrafraction real-time guidance methods have been used during prostate cancer treatments. Systems such as CyberKnife (Accuray, Sunnyvale, CA) and the real-time tracking radiotherapy (RTRT) system use real-time kilovoltage (kV) images from two (CyberKnife) or four (RTRT system) orthogonal room-mounted imagers to track the prostate position based on segmented positions of implanted fiducial markers (King et al. 2009, Kitamura et al. 2002, Sazawa et al. 2009, Shimizu et al. 2000, Shirato et al. 2003, 2000). The commercial systems Calypso (Varian, Palo Alto, CA) (Kupelian et al. 2007) and RayPilot (Micropos, Gothenburg, Sweden) (Castellanos et al. 2012) utilize implanted electromagnetic transponders, transmitting positional signals to an external receiver. Emerging real-time guidance technologies include ultrasonography (Ballhausen et al. 2015) and integrated magnetic resonance imaging (MRI)-radiation therapy systems (Fallone et al. 2009, Raaymakers et al. 2009). Common to all these methods is the need for additional dedicated and typically expensive equipment to perform the real-time guidance.

For purposes of this invention, "real time" has its ordinary meaning of the actual time when a process or event occurs. This implies in computing that the input data is processed within milliseconds so that it is available virtually immediately as feedback.

Real-time motion monitoring should ideally be performed using a standard linear accelerator (linac) without relying on additional hardware. To this end, a number of algorithms have been proposed for the purpose of estimating the target's position in 3D based on its location on a 2D image, which can be acquired using a linear accelerator gantry mounted kilovoltage (kV) x-ray imager system. An apparent advantage of utilizing the kV imager is that: most modern linear accelerators have a kV imager, mounted orthogonally to the treatment beam. However, as the target position on the kV imager only contains 2D information, a 2D 3D target position estimation is often required. The sparse information renders the problem of solving for the target's 3D position ill-posed, hence, some prior knowledge is usually required.

A different approach for 2D 3D estimation is to make use of interdimensional correlation (IDC), which works for two reasons: (1) thoracic tumour motion in the anterior-posterior (AP) and left-right (LR) are correlated to its motion in the superior-inferior (SI) direction; and (2) as the gantry rotates around the patient, the SI position of the tumor is always visible on the kV images. Poulsen et al. (2008a) implicitly incorporated IDC into their Maximum Likelihood Estimation (MLE) of a Gaussian distribution. Other authors have shown that IDC can be used exclusively for 2D-3D estimation, i.e without probability estimation, including (Cho et al. 2012) and (Chung et al. 2016). Unfortunately, for tumors outside of the thoracic and upper abdominal region, the IDC method does not work. Poulsen et al. (2008) proposed a maximum likelihood estimation (MLE) algorithm to estimate the target's 3D position assuming a Gaussian distribution, which can be built after a learning arc. This solution has been clinically implemented as the kilovoltage intrafraction monitoring (KIM) system, and is currently being trialled for real-time tumor motion guidance in a pilot clinical trial and a multi-center clinical trial (Keall et al. 2016, Nguyen et al. 2017).

Prostate motion represents a particularly challenging problem as the motion is a random walk, with ever fluctuating IDC and motion magnitude (Ballhausen et al. 2015). For accurate estimation of intrafraction prostate motion from 2D projection information, (Poulsen et al. 2009) and subsequent work (Keall et al. 2015) updated the probability density function (PDF) frequently after the initial learning arc of 120 degrees. Such re-optimization is both time consuming and computationally expensive.

SUMMARY

An exemplary object of the invention is to provide a system and method for estimating 3D tumor position during radiotherapy which includes acquiring 2D image positions of the tumor, such as a prostate tumor in a human subject, from a kV imager on a linear accelerator, implementing a Kalman filter framework using one or more computers to estimate 3D motion of the tumor from 2D image projection measurements in real-time during radiotherapy treatments, wherein the Kalman filter is an iterative framework which allows estimation of the measurement and process error to be re-estimated from current and past measurements, updating tumor motion covariance with every image frame based on a last observed position of the tumor on a previous kV image, and outputting to a display during the radiotherapy treatment the updated tumor motion covariance.

An exemplary purpose of this invention is to estimate 3D prostate motion in real-time during irradiation from 2D prostate positions acquired from a kV imager on a standard linear accelerator utilizing a Kalman Filter (KF) framework. Advantages of this novel method include: (1) eliminating the need of an initial learning period, therefore reducing patient imaging dose, (2) more robust against measurement noise and (3) more computationally efficient. In this paper, the novel KF method was evaluated in silico using patients' 3D prostate motion and simulated 2D projections.

In the methodology demonstrating the utility of the invention, a KF framework was implemented to estimate 3D motion from 2D projection measurements in real-time during prostate cancer treatments. The noise covariance matrix was adaptively estimated from the previous 10 measurements. This method did not require an initial learning period as the KF process distribution was initialized using a population covariance matrix. This method was evaluated using a ground-truth motion dataset of 17 prostate cancer patients (536 trajectories) measured with electromagnetic transponders. 3D motion was projected onto a rotating imager (SID=180 cm) (pixel size=0.388 mm) and rotation speed of 6°/s and 2°/s to simulate VMAT treatments. Gantry-varying additive random noise (≤5 mm) was added to ground-truth measurements to simulate segmentation error and image quality degradation due to the patient's pelvic bones. For comparison, motion was also estimated using the clinically implemented Gaussian Probability Density Function (PDF) method initialized with 600 projections.

The results obtained without noise were that the 3D root-mean-square-errors (3D RMSEs) of motion estimated by the KF method were 0.4±0.1 mm and 0.3±0 2 mm for 2°/s and 6°/s gantry rotation, respectively. The results obtained with noise were that 3D RMSEs of KF estimated motion were 1.1±0 1 mm for both slow and fast gantry rotation scenarios. In comparison, using a Gaussian PDF method, with noise, 3D RMSE was 2±0.1 mm for both gantry rotation scenarios.

Thus, the methodology and system described herein presents a fast and accurate method for real-time 2D to 3D motion estimation using a Kalman filter approach to handle the random-walk component of prostate cancer motion. This method has sub-mm accuracy and is highly robust against measurement noise. The methodology can be implemented during radiotherapy treatments to allow for accurate presentation on a display the updated tumor motion. In addition, by initializing the digital processing with a population covariance matrix, a learning period can be avoided.

DESCRIPTION OF THE INVENTION

Preferred embodiments of the invention will now be described with reference to the accompanying drawings and non-limiting examples.

A Kalman filter approach is presented for estimating prostate 3D intrafraction motion from 2D projection information without requiring re-optimization. An advantage of the method is that by initializing with a population covariance matrix, a learning period is not necessary.

The implementation of a solution for the 2D→3D estimation problem using a Kalman filter approach is described first. Then, the simulation framework to evaluate the Kalman filter approach in a number of different clinical scenarios using patient prostate traces from a database of 17 patients and 536 treatment fractions (Langden et al. 2008) is presented.

2D→3D Prostate Motion Estimation with a Kalman Filter Approach

In accordance with Kalman filter literature (Kalman 1960), the following notations are used:

$\hat{x}$: the estimated positional vector of the target $x=[x\ y\ z]^T$ in the patient 3D IEC coordinate system, at the current projection.

$\hat{x}_{k-1}$: the estimated positional vector of the target (x) in the previous projection.

$F_k$: the state transition matrix of the system from $x_{k-1}$ to $x_k$.

$P_k$: the predicted error covariance matrix at the current projection.

$Q_k$: the covariance of the process at the current projection.

$R_k$: the covariance of the observation noise at the current projection.

$z_k$: the vector of the measurement, i.e. 2D segmentation of the marker, at the current projection, $z_k=[u_x, u_y]^T$ in the imager coordinate.

$\tilde{y}_k$: the residual error between the estimated measurements and the actual measurements.

In addition, the matrix $H_k$ denotes the transformation between the target 3D positional vector $x_k$ and its measurable 2D position on the imager $z_k=[u_x, u_y]$. For a linac geometry, with the imaging system rotates around y-axis, the following projection equation applies:

$$\mathcal{P}(x_k \mid \theta) = (u_x, u_y) = \frac{SID}{SAD - (x \cos\theta + z \sin\theta)} N(x_k \mid \theta) \quad (1)$$

where:

θ: the current projection angle.

SID: source to imager distance in mm
SAD: source to axis (isocenter) distance in mm $$B(x_k \mid \theta) = \begin{pmatrix} x \sin \theta - z \cos \theta \\ y \end{pmatrix}$$

While the optimal Kalman filter framework requires $H_k$ to be linear such that $z_k = H_k x_k$, we approximate $H_k$ as:

$$H_k = \frac{SID}{SAD - (x_{k-1}[1] \cos \theta + x_{k-1}[3] \sin \theta)} \Theta \quad (2)$$

with $\Theta = \begin{pmatrix} \cos(\theta) & 0 & \sin(\theta) \\ 0 & 1 & 0 \end{pmatrix}$.

Finally, as the prostate generally does not often move or move very little from one projection to the next, the state transition matrix $F_k$ is initialised and set to the identity matrix:

$$F = F_k = I = \begin{pmatrix} 1 & 0 & 0 \\ 0 & 1 & 0 \\ 0 & 0 & 1 \end{pmatrix} \quad (3)$$

Initialization

Kalman filter is an iterative framework, which allows the optimal estimation of the measurement and process error to be optimally re-estimated from the current and past measurements. To start the iterative process, it is necessary to initialize the following parameters: $Q_0$, $R_0$, $P_0$ and $x_0$.

As stated above, the matrix $Q_0$ represents the process covariance, which for the purpose of motion estimation, represents both the range of motion and the interdimensional correlation of the motion:

$$Q_k = \sum(x) = \begin{pmatrix} \sum(x, x) & \sum(x, y) & \sum(x, z) \\ \sum(y, z) & \sum(y, y) & \sum(y, z) \\ \sum(z, x) & \sum(z, y) & \sum(z, z) \end{pmatrix} \quad (4)$$

From a large database of 17 prostate motions with 536 motion traces from different treatment days, we obtained the population covariance of prostate motion:

$$Q_0 = Q_k = \begin{pmatrix} 0.3136 & 0.0114 & -0.0775 \\ 0.0114 & 1.8820 & 1.5051 \\ -0.0775 & 1.5051 & 2.4733 \end{pmatrix} \quad (5)$$

For the measurement error matrix $R_0$, initially, it is difficult to estimate the error of the measurement process, we initialized this matrix as:

$$R_0 = \begin{pmatrix} 0.2 & 0.2 \\ 0.2 & 0.2 \end{pmatrix} \quad (6)$$

with the intention that $R_k$ will be updated using the measurement history. The value 0.2 was chosen to give reasonable credit to the measurement system initially. As the measurement error matrix will be updated as soon as the measurement, i.e. projection, occurred, this initial value is actually not important for our Kalman filter framework. With similar logic, error matrix $P_0$ is also initialized to be a zero matrix with the reasonable expectation that the entire system has limited to no error.

Finally, $x_0$ was initialized to the initial prostate position of the patient on the treatment day. In a realistic clinical scenario, a patient's markers would be the used. The initial markers' position of the day can be easily obtained by performing IGRT, either with kV-kV match or Cone Beam CT, both of which are clinical standard.

Prediction Phase

The following equation describe the prediction phase of Kalman filter, which estimates the current position, based purely on the information of the motion distribution up to the last frame (k−1):

$$\hat{x}_{k|k-1} = F \hat{x}_{k-1|k-1} \quad (7)$$

In addition, following Kalman (1960) the current measurement error matrix $P_k$ can also be estimated based on the previous distribution $P_{k-1|k-1}$ and the expected distribution of prostate motion $Q_k$, as described above.

$$P_{k|k-1} = F P_{k-1|k-1} F^T + Q_k \quad (8)$$

Update Phase

With measurement information, $z_k$, the error between the predicted and actual measurement is calculated as:

$$\tilde{y}_k = z_k - H_k \hat{x}_{k|k-1} \quad (9)$$

with $H_k$ updated based on equation (2).

The following operations are then used to calculate the optimal Kalman gain ($K_k$) given the residual error of the prediction (Kalman 1960):

$$S_k = R_k + H_k P_{k|k-1} H_k^T \quad (10)$$

$$K_k = P_{k|k-1} H_k^T S_k^{-1} \quad (11)$$

We can then re-estimate the current position given the current projection information:

$$\hat{x}_{k|k} = \hat{x}_{k|k-1} + K_k \tilde{y}_k \quad (12)$$

Finally, the a posteriori covariance can be estimated optimally to be used for future prediction and update, as:

$$P_{k|k} = (I - K_k H_k) P_{k|k-1} \quad (13)$$

Measurement Noise Matrix Update

To acquire 2D measurement $z_k$ of the target at the current projection k, some type of segmentation of the target on the projection would be required. For prostate, this is mostly likely segmentation of the implanted fiducial markers. Most segmentation algorithms in this space to date use template matching (Flelidius et al. 2012). Thus, the measurement noise matrix can be estimated from the normalized cross correlation value, $\rho_k$, between the segmented marker and the template used. When there is limited information on the noise error, this value can be used as the surrogate to indicate how reliable the measurement is:

$$R_k = w \begin{pmatrix} (1-\rho_k) & (1-\rho_k) \\ (1-\rho_k) & (1-\rho_k) \end{pmatrix} \quad (14)$$

the weight factor w is included as the normalised cross correlation is only a surrogate for the error. When evaluated the present method, w was set to 0.5.

With accumulated projection information, a better estimate of the measurement noise can be determined based on the recent history of measurements. For prostate motion, it is reasonable to assume that the target does not move significantly from one projection to the next. With hardware limitation of the gantry, which prevents it from moving at high speed, we can also assume that the measured target position from one frame to the next is small. Thus, the error of measurement can be estimated as:

$$\varepsilon_k = z_k - z_{k-1} \qquad (15)$$

If N recent measurement errors are considered, the following covariance of measurement noise can be estimated:

$$\Sigma(\varepsilon_{(k-N)\to k}) = \Sigma(\varepsilon_{(k-N)\to k}^{u_x}, \varepsilon_{(k-N)\to k}^{u_y}) \qquad (16)$$

Combining the equations (15) and (16), when more than N measurements are available, the measurement noise matrix can be estimated as:

$$R_k = \sum (\varepsilon_{(k-N)\to k}) + w \begin{pmatrix} (1-\rho_k) & (1-\rho_k) \\ (1-\rho_k) & (1-\rho_k) \end{pmatrix}$$

Lastly, a segmentation algorithm is sometimes constrained by the pixel spacing on the detector, which is 0.388 mm in most modern linear accelerator kV systems. An additional parameter representing the error due to pixelation (0.388 mm) can be added to the overall $R_k$ measurement noise matrix. For the in silico evaluations, N=10 was used. When used in conjunction with radiotherapy of a subject (human or animal) N can range widely, e.g., from 2 to 100.

Evaluation Framework with Patients' Prostate Traces

Figure 1:
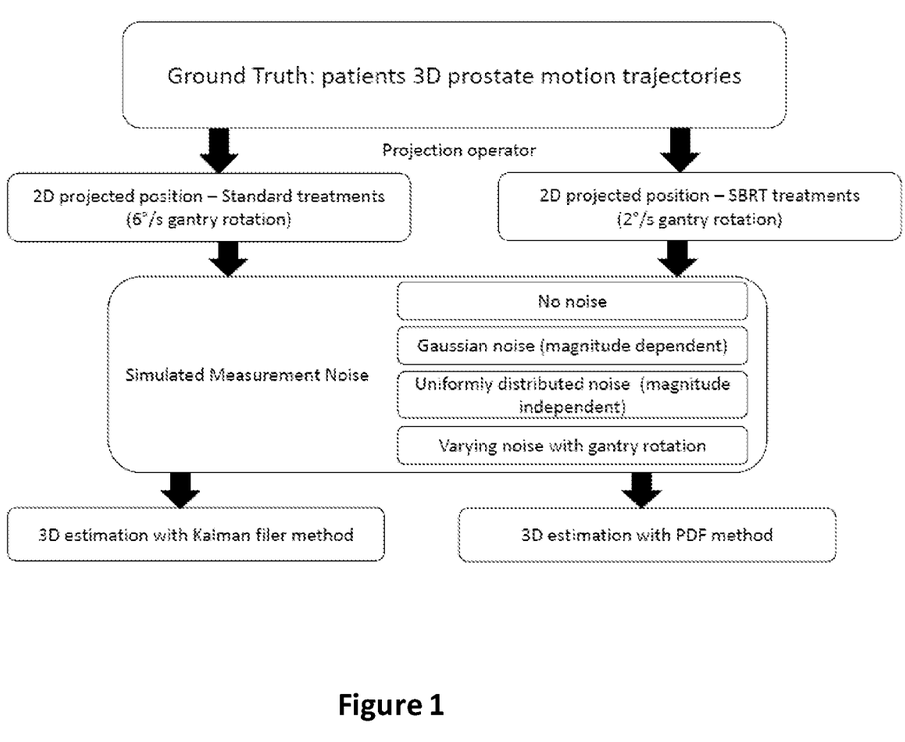
FIG. 1 is a flowchart showing the processes for 3D Intrafraction prostate motion estimation using the Kalman Filter method (KF) as compared with ground-truth motion and the clinically implemented PDF method.

FIG. 1 provides an outline of the evaluation framework. In FIG. 1, 3D Intrafraction prostate motion estimation using the Kalman Filter method (KF) is compared with ground-truth motion and the clinically implemented PDF method. As will be discussed and demonstrated below, KF method is more accurate as the random-walk prostate motion is better handled. In both cases, the imaging frequency was simulated at 10 Hz with no added noise.

To characterize the performance and validate the Kalman method, a ground-truth dataset of 17 prostate cancer patients with implanted Calypso transponders, who were treated at the MD Anderson Cancer Centre in Orlando (FL, USA) in 2005 and 2006 Langen et al. (2008) was used. The transponders data represented the ground-truth motion of the patients' prostates during treatment, recorded at 10 Hz. Each patient had between 24 to 34 treatment fractions, each resulted in a motion trajectory in the ground-truth dataset, with length between 405 s to 800 s. In total, this ground-truth dataset consisted of 536 motion trajectories with more than 92 hours of recording. The range of motion in this database was [−3.6 4.8] mm in the x (Left-Right) direction, [−10.1 16.4] mm in the y (Superior-Inferior) direction and [−11.2 17.9] mm in the z (Anterior-Posterior) direction.

In order to test the accuracy of the proposed Kalman filter approach in estimating prostate motion, for each patient trajectory in the ground-truth dataset, the ground-truth 3D positions of the transponders were projected onto an imager using the projection equation (1). The SAD and SID value were set at 1000 mm and 1800 mm, respectively. This projection step is to simulate a realistic scenario during treatment in which radio-opaque implanted markers can be segmented from intrafraction kV images. All simulations started with the MV gantry (90^° to the imaging projection angle) starts at 180^°.

We investigated the accuracy and precision of the Kalman filter method at different imaging rate by down-sampling the input projection data to: 1 Hz, 0.3 z and 0.2 Hz.

The resilience of the Kalman filter method in the presence of measurement noise was also investigated. The measurement noise was modelled in two ways: (1) Gaussian white noise and (2) Random uniformly distributed noise. Both types of noise was additive noise. We also modelled pixelation for a typical pixel spacing of 0.388 mm, usually found for the X-ray imager of a linear accelerator. Gaussian white noise of two Signal-to-Noise ratios (SNRs) 5 dB and 20 dB were evaluated. For random noise, the following noise levels were tested:

- additive ±2 mm random noise applied uniformly to every measurement
- additive ±5 mm random noise applied uniformly to every measurement
- additive ±5 mm random noise applied uniformly to measurements for gantry angles within ±10° of the lateral imaging angles, i.e. 90° and 270°.

The last noise modelling was to simulate the effect of the reduction in imaging quality for prostate patients during treatments due to kV and MV scatter through the patient's hip bones.

For each noise scenario, we compared our method motion estimating error with the ground-truth motion. We also computed the motion estimation by the PDF method (Poulsen et al. 2009) to directly compared with our results in these scenarios.

Results

Theoretical Accuracy

Table 1 shows the statistics of the estimating errors by the proposed Kalman filter method. The accuracy (mean error) and precision (standard deviation of error) of the proposed method are sub-millimetric in both tested gantry speed for motion in Left-Right (LR), Superior-Inferior (SI), Anterior-Posterior (AP) and 3D directions, respectively. Table 1 also includes the range of errors within 98% and 95% of the mean.

TABLE 1

Accuracy and precision of the Kalman filter method in estimating patients prostate motion in the tested dataset, assuming no measurement noise.

| Gantry Speed | Statistics | LR(mm) | SI(mm) | AP(mm) | 3D(mm) |
|---|---|---|---|---|---|
| VMAT 2°/s | Mean ± SD | 0.0 ± 0.2 | 0.0 ± 0.0 | 0.0 ± 0.3 | 0.2 ± 0.3 |
| | Median | 0.0 | 0 | 0 | 0.2 |
| | [2.5$^{th}$ 97.5$^{th}$] percentile | [−0.4 0.4] | [−0.0 0.0] | [−0.6 0.6] | [0.0 0.9] |
| | [1$^{st}$ 99$^{th}$] percentile | [−0.6 0.5] | [−0.0 0.0] | [−0.9 0.9] | [0.0 1.3] |
| | RMSE | 0.2 | 0.0 | 0.3 | 0.4 |
| VMAT 6°/s | Mean ± SD | 0.0 ± 0.2 | 0.0 ± 0.0 | 0.0 ± 0.2 | 0.2 ± 0.2 |
| | Median | 0.0 | 0 | 0 | 0.1 |
| | [2.5$^{th}$ 97.5$^{th}$] | [−0.3 0.3] | [−0.0 0.0] | [−0.4 0.4] | [0.0 0.7] |

TABLE 1-continued

Accuracy and precision of the Kalman filter method in estimating patients prostate motion in the tested dataset, assuming no measurement noise.

| Gantry Speed | Statistics | LR(mm) | SI(mm) | AP(mm) | 3D(mm) |
|---|---|---|---|---|---|
| | percentile [1st 99$^{th}$] percentile | [−0.4 0.4] | [−0.0 0.0] | [−0.7 0.6] | [0.0 1.0] |
| | RMSE | 0.2 | 0.0 | 0.2 | 0.3 |

RMSE: Root Mean Square Error.

Figure 2:
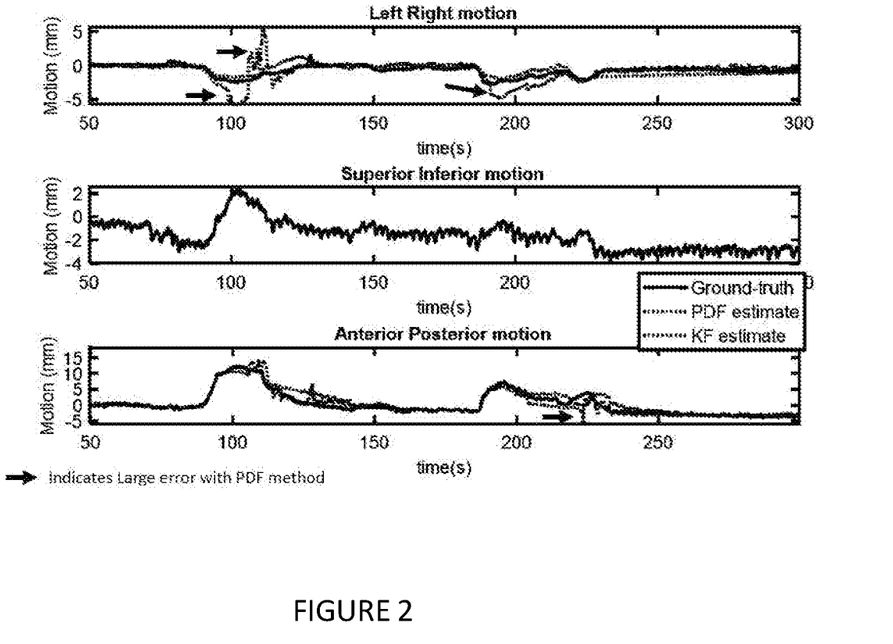
FIG. 2 are graphs showing 3D Intrafraction prostate motion estimation using the Kalman Filter method (KF) compared with ground-truth motion and the clinically implemented PDF method.

An example of the prostate 3D motion estimated by KF method is shown in FIG. 2, showing the KF method is more accurate than the PDF method in estimating the LR and AP motion. KF method is more accurate as the random-walk prostate motion is better handled. In both cases, the imaging frequency was simulated at 10 Hz with no added noise.

As the frame rate decreased, the accuracy of the Kalman filter slightly decreased, as shown in Table 2. With imaging rates as low as 0.3 Hz, the [1$^{st}$-99$^{th}$] percentile range of errors in the LR, SI and AP directions were under 1 mm for both fast 6°/s and slow 2°/s gantry rotation treatments. However, with 0.2 Hz imaging rate, only the fast gantry rotation treatments had more than 98% of errors less than 1 mm Additionally, 98% of 3D errors were less than 2 mm for all tested imaging rates.

TABLE 2

Motion estimation errors with the Kalman filter method with different imaging frame rates.

| Estimation error | [1$^{st}$-99$^{th}$] (mm) percentile of error for each frame rate (frames per second) | | | |
|---|---|---|---|---|
| | 10 | 1 | 0.3 | 0.2 |
| Left-Right | [−0.56 0.54] | [−0.62 0.58] | [−0.64— 0.54] | [−0.67— 0.54] |
| Superior-Inferior | [−0.05— 0.05] | [−0.08— 0.09] | [−0.14— 0.19] | [−0.22— 0.32] |
| Anterior-Posterior | [−0.89 0.90] | [−0.88— 0.82] | [−0.96— 0.89] | [−1.1— 0.98] |
| 3D | [0.01 1.3] | [0.01— 1.4] | [0.01— 1.7] | [0.0— 1.9] |

| Estimation error | [1$^{st}$-99$^{th}$] (mm) percentile of error for each frame rate (frames per second) | | | |
|---|---|---|---|---|
| | 10 | 1 | 0.3 | 0.2 |
| Left-Right | [−0.44— 0.43] | [−0.43— 0.42] | [−0.48 —0.42] | [−0.49— 0.43] |
| Superior-Inferior | [−0.02— 0.02] | [−0.08— 0.09] | [−0.15— —0.16] | [−0.26— 0.24] |
| Anterior-Posterior | [−0.66— 0.63] | [−0.65— 0.62] | [−0.79— —0.73] | [−0.98— 0.86] |
| 3D | [0.01— 1.0] | [0.01— 1.1] | [0.01— —1.6] | [0.0— 1.8] |

Above: motion estimation error with gantry rotation speed of 2°/s.
Below: motion estimation error with gantry rotation speed of 6°/s.

Kalman Filter Vs. PDF: In the Absence of Measurement Noise

In the absence of noise, KF method was as accurate and as precise as Gaussian PDF method (Poulsen et al. 2008). The 3D RMSEs for both methods, across all tested points, were 0.4 mm with slow gantry rotation and 0.3 mm with fast gantry rotation. For slow VMAT treatments, 3D errors were larger than 1 mm for 2.1% of the time when motion was estimated with Kalman filter method and for 2.5% of the time with the PDF method. With fast gantry rotation, the percentage of time with 3D errors >1 mm decreased to 1% with Kalman filter method and 1.14% with PDF method.

Figure 3:
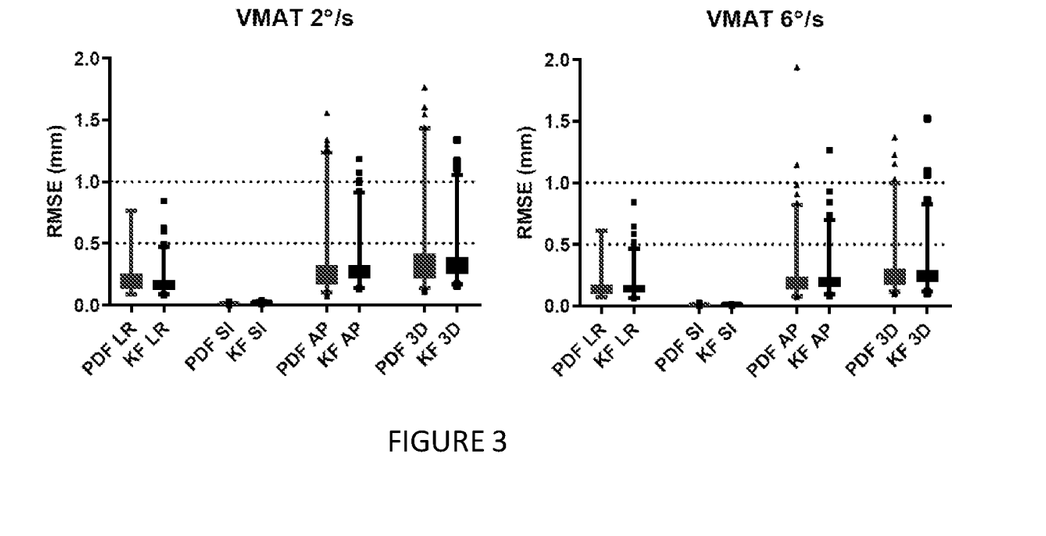
FIG. 3 are Box plots of the Root Mean Square Error (RMSE) in estimating patients prostate motion in the ground-truth dataset with Kalman Filter (KF) and Poulsen's et al. (2009) Gaussian PDF method (PDF), respectively. The whiskers contain 98% of data.

For each motion trajectory in the tested dataset, the two algorithms perform similarly well. However, KF method was more consistent in its performance with a tighter distribution of RMSE for all traces, as shown in the box plots in FIG. 3.

Kalman Filter Vs. PDF: In the Presence of Measurement Noise

Figure 4:
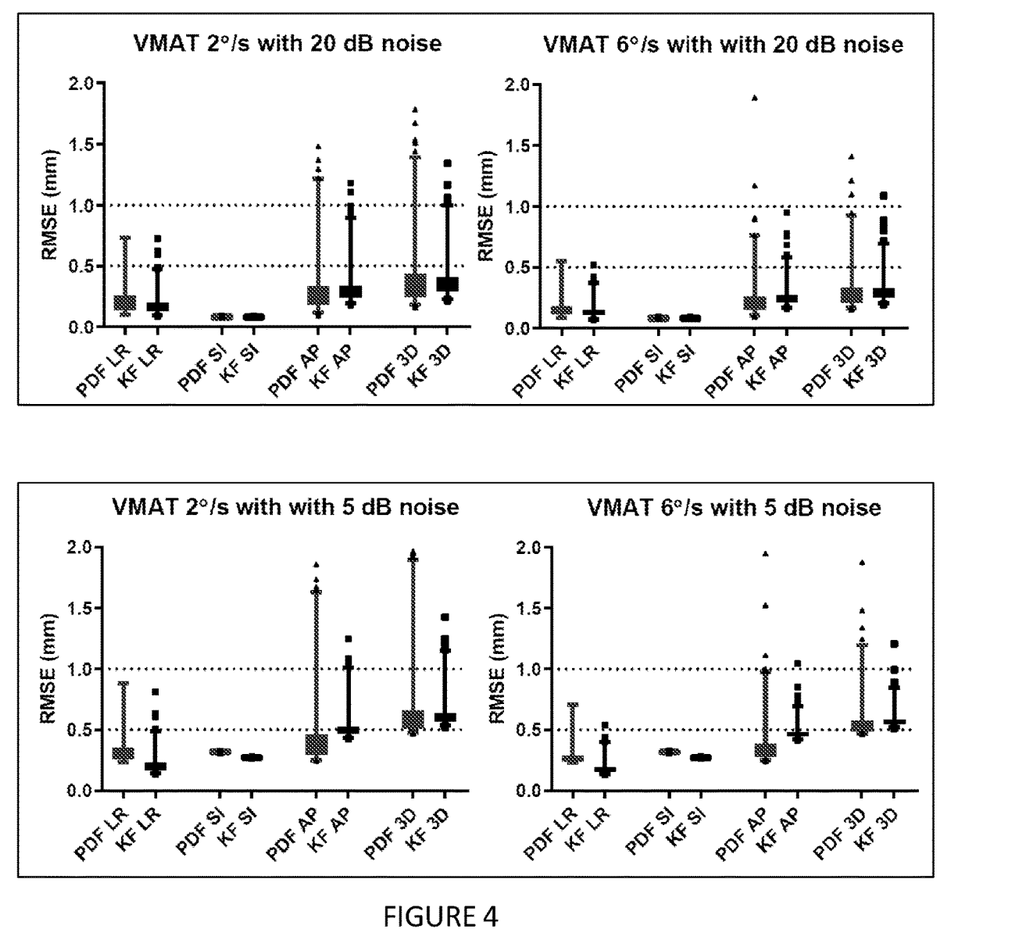
FIG. 4 are Box plots of the Root Mean Square Error (RMSE) in estimating patients prostate motion in the ground-truth dataset with Kalman Filter (KF) and Poulsen's et al. (2009) Gaussian PDF method (PDF) with additive Gaussian white noise, respectively. The whiskers contain 98% of data. Top: with SNR=20 dB. Bottom: with SNR=5 dB.

The performance of KF method and the PDF method for each motion trajectory in the tested dataset in the presence of additive Gaussian white noise is summarized in FIG. 4. With both moderate noise level (SNR=20 dB) and high noise level (SNR=5 dB), it was evident that KF method performed more consistently across more patient traces. The ranges of RMSE errors were consistently smaller with Kalman Filter method, compared with PDF method. The mean RMSE values were lower than 1 mm for LR, SI, AP and 3D errors for all tested scenarios, and were similar for both methods.

Figure 5:
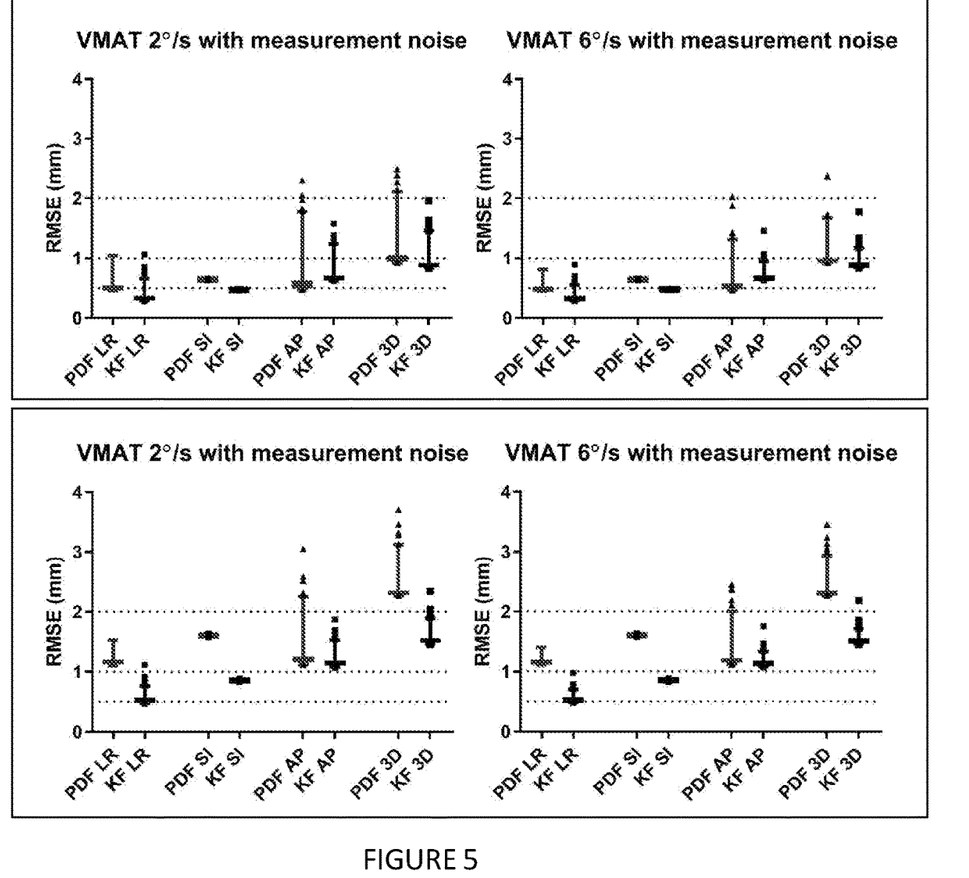
FIG. 5 are Box plots of the Root Mean Square Error (RMSE) in estimating patients prostate motion in the ground-truth dataset with Kalman Filter (KF) and Poulsen's et al. (2009) Gaussian PDF method (PDF) with additive random noise, respectively. The whiskers contain 98% of data. Top: with ±2 mm of random noise. Bottom: with ±5 mm of random noise.

Random noise had a more profound effect on both of the algorithms, as shown in FIG. 5. With additive random noise of up to ±5 mm, across the patients motion trajectories, with PDF method, RMSEs in LR, SI, AP and 3D were all larger than 1 mm with both fast and slow gantry rotation. With KF method, the mean of RMSEs were below 1 mm for motion estimation in the LR and SI directions. On the entire dataset, with slow gantry rotation, with up to ±5 mm random noise addition, the RMSEs were 0.5 mm, 0.9 mm, 1.2 mm and 1.5 mm in the LR, SI, AP and 3D directions, respectively, for the Kalman filter method. With the PDF method, the 3D RMSE error increased to 2.4 mm. The RMSEs were slightly lower with fast gantry rotation.

With KF method, when the measurements contained up to 5 mm random errors, 3D errors were larger 2 mm for <17% of time while with PDF method, 3D errors were larger than 2 mm for >60% of time. When the measurements contained up to 2 mm of random errors, the Kalman filter 3D errors exceeded 1 mm for <26% of time, whilst the PDF 3D errors exceeded 1 mm for more than 40% of time.

Figure 6:
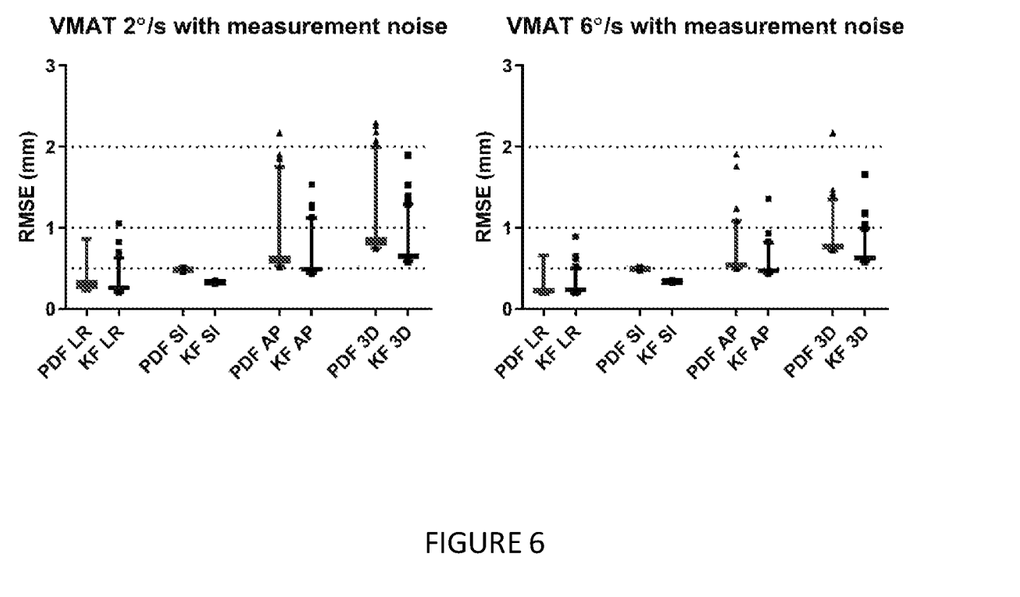
FIG. 6 are Box plots of the Root Mean Square Error (RMSE) in estimating patients prostate motion in the ground-truth dataset with Kalman Filter (KF) and Poulsen's et al. (2009) Gaussian PDF method (PDF) with ±5 mm additive random noise at lateral imaging angles, respectively. The whiskers contain 98% of data.

In the scenario where the random noise only applied to measurements close to the lateral projections, as shown FIG. 6, the Kalman filter performed more consistently across all 536 tested motion trajectories. Using the PDF method to estimate motion with fast gantry rotation, the 3D RMSE of 54 motion trajectories (10%) were larger than 1 mm, with 19 of these cases had 3D RMSEs larger than 2 mm Using the Kalman filter method under the same condition, only 4 cases (0.75%) had 3D RMSE larger than 1 mm and none were larger than 2 mm Analysis and Generalized Method and System The results above demonstrate a novel system and method to estimate the 3D prostate tumor position during radiotherapy based on the iterative Kalman Filter algorithm was developed. A distinct advantage of this method compared to previously proposed methods (Poulsen et al. 2008) is that it does not require a learning arc to initialize. The method was extensively evaluated in silico using a 3D prostate motion database from 17 cancer patients in two different radiotherapy treatment scenarios: normal fractionation VMAT (6°/s) and SBRT VMAT (2°/s). The database includes 536 motion trajectories, each contains 405 seconds to 800 seconds of intrafraction motion recording. The accuracy and precision of the proposed method was found to be comparable with the PDF method and was under 1 mm for all axes of motion at all tested imaging frequency. The accuracy of our method in tracking the prostate is similar to that of the electromagnetic transponder system Calypso (Santanam et al. 2008) and outperforms the reported accuracy of the commercial ultrasound guidance system Clarity (Robinson et al. 2012).

The KF method does not require an initial learning period to initialize its parameters. Instead, a population covariance was used as the state-transition covariance (Equation 5). As the prostate is tracked on more incoming kV images, the a posteriori covariance of the process distribution iteratively evolves to include errors from previous estimation using Eqn.8. Poulsen et al. (2009) evaluated the use of the population covariance to initialize the PDF method for prostate cancer monitoring from kV images. However, with the PDF method, the use of the population covariance resulted is less accurate result (Poulsen et al. 2009). With the proposed KF method, we were able to achieve similar accuracy and precision to the PDF method with 600 frames of initialization. This is because the present KF method updates the motion covariance with every frame based on the last observed position of the target on the previous kV image.

The method is more computationally efficient in that it does not require constant re-optimization to handle the random-walk nature of prostate motion (Ballhausen et al. 2015). Existing methods require constant re-optimization of parameters to handle the randomness of prostate motion (Poulsen et al. 2008, Keall et al. 2015), which is computationally expensive. The described system and method handles the randomness of prostate motion through the Kalman gain parameter (Equation 12). This process evolves iteratively with each acquired kV image, requiring no re-optimization of parameters. In the data above, it was also shown that the KF method is robust with lowering kV imaging frequency. For prostate cancer monitoring, as the target movement is typically slow, high target monitoring accuracy at lower frame rate results in less imaging dose to the patient whilst maintaining the treatment accuracy.

Measurement noise, i.e. possible errors from marker segmentations and imaging noise, is handled explicitly with the above described system and method with Eqn.14. The robustness of both the proposed KF method and the PDF method were evaluated by increasing the measurement noise as Gaussian noise (FIG. 4), random noise (FIG. 5) and increasing random noise at lateral imaging angles (FIG. 6). While the results above are based on simulated rather than measured noise, in all scenarios, especially with gantry-varying noise, the KF method was more robust than the PDF method. A number of noise models were included to address this limitation. These included Gaussian white noise, which is dependent on the signal amplitude, random uniformly distributed noise, which is not amplitude dependent, and gantry-dependent noise. Among these noises, following an analysis of 46 prostate patient SBRT treatments reported by Hewson et al. (2019), the gantry-dependent noise dominated other type of measurement noise during treatment due to the presence the pelvic bones in patients. As demonstrated above, the KF method outperformed the PDF method for this type of noise. In reality, measurement noise on 2D projection is due to (1) a limitation of the segmentation algorithm and (2) a combination of kV and MV scatter collected by the kilovoltage imager. Because of first factor, the performance of KF method and its robustness against real measured noise will depend on the segmentation algorithm used to detect the targets on kV images. Given that the KF method has the ability to adapt to measurement noise, it is possible to achieve accurate 3D estimation with less accurate segmentation methods. Scatter noise on intrafraction kV images resembles Gaussian noise simulated in the present study as the overall noise profile is a combination of multiple random processes. Thus, the KF method should perform better than PDF method against measurement noise in patients' images.

Figure 7:
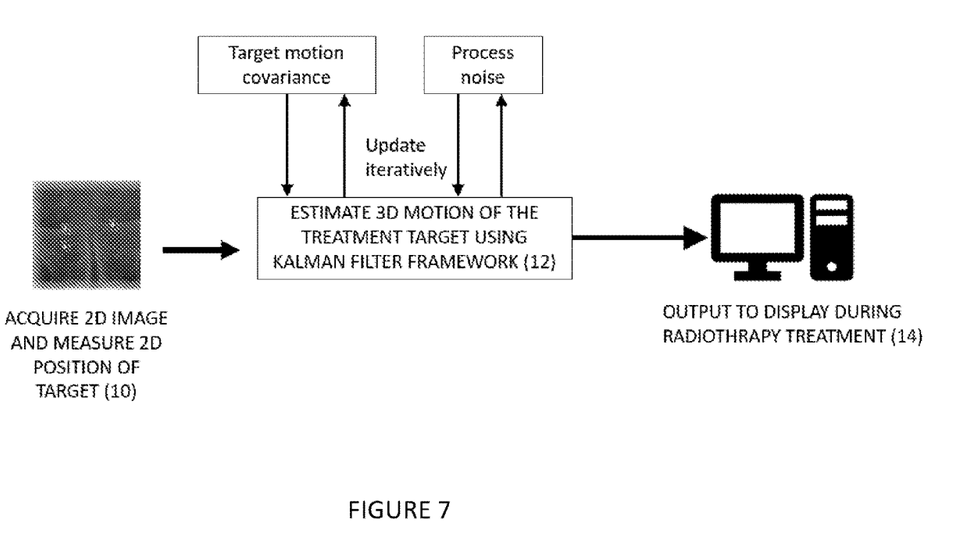
FIG. 7 is a flow chart illustrating a generalized methodology for employing the estimation 3D target position during radiotherapy.

As shown in the simplified flow chart of FIG. 7, when a human or animal subject will be treated with radiotherapy, e.g., a human male patient with prostate cancer (other subjects and tumors are wide ranging and may include liver cancer, lung cancer, breast cancer), the subject will be treated with radiation energy while acquiring 2D image positions of the treatment target(s) or its surrogate such as implanted fiducial markers at step 10. The imaging system may be a linear accelerator gantry mounted kilovoltage x-ray imager system or other suitable arrangement. A Kalman filter framework is used to estimate the 3D motion of the target from the 2D image projection measurements in real-time during radiotherapy at step 12. The Kalman filter is an iterative framework which allows estimation of the target 3D position and the process error to be re-estimated from current and past measurements. During radiotherapy at step 14, the tumor motion covariance is updated with every image frame based on the last observed position of the tumor on a previous kV image, and this is output to a display for the radiation oncologists or therapists or an automatic adaptive radiotherapy system such as MLC tracking to observe and use during radiotherapy.

Figure 8:
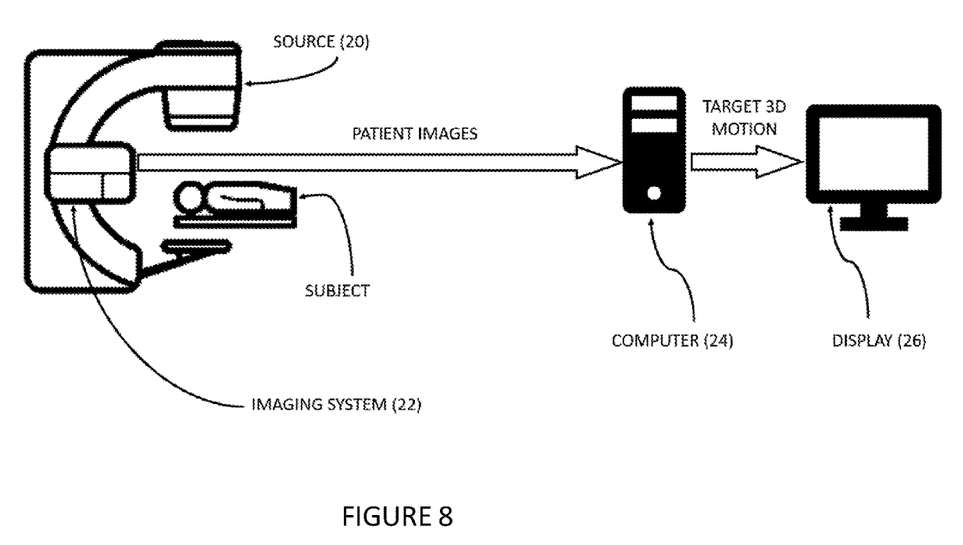
FIG. 8 is a schematic of a system for practicing the generalized methodology.

FIG. 8 shows a simplified system where a source 20 of radiation energy is used for providing the subject with radiotherapy. An imaging system 22 provides 2D images of the treatment target during radiotherapy. A computer or suite of linked computers 24 is used to implement a Kalman filter framework to estimate the 3D motion of the target from the digitally processed 2D image projection measurements. The computer then outputs the target motion on a display based on the results with the Kalman filter algorithm for an oncologist or radiation therapists or an automatic adaptive radiotherapy system to observe and use during radiotherapy.

It is further envisaged pursuant to this embodiment of the present invention, that the aforementioned methods and processes described with the foregoing embodiments may be implemented and operated by hardware device such as a computer running software that implements the processes and methods. The computer 24 may be adapted to operate the aforementioned processes and methods as a distinct code or software either loaded or embedded within the memory of the computer 24. The output of the processes may be displayed on the display device 26. Display device 26 may be a computer monitor or screen to allow the user to visual see the output information.

Preferably, the computer 24 may be connected to further networks including but limited to the internet to improve interoperability. Data and information from the processes and methods may be relayed or remotely accessed by other computers (not shown) on the permitted or allowed networks.

Preferably, the patient images received from the system 22 may be compiled or compacted for storage purposes on the computer 24.

Furthermore, the methods and process of the aforementioned embodiments may be integrated into a single standalone device including the imaging system 22, computer 24 and display 26. This combined standalone device (not shown) may be encapsulated within the one single housing for convenience.

REFERENCES

Ballhausen, H., Li, M., Hegemann, N.-S., Ganswindt, U. & Belka, C. (2015), 'Intra-fraction motion of the prostate is a random walk', Phys Med Biol 60(2). Castellanos, E., Ericsson, M. H., Sorcini, B., Green, U., Nilsson, S. & Lennerrlas, B. (2012), 'Raypilot—electromagnetic real-time positioning in radiotherapy of prostate cancer— initial clinical results', Radiother Oncol 103 (suppl 1), S433.

Cho, B., Poulsen, P. R, Ruan, D., Sawant, A. & Keall, P. J. (2012), 'Experimental investigation of a general real-time 3d target localization method using sequential kv imaging combined with respiratory monitoring', Phys Med Biol 57, 7395-7407.

Chung, H., Poulsen, P. R, Keall, P. J., Cho, S. & Cho, B. (2016), 'Reconstruction of implanted marker trajectories from cone-beam ct projection images using interdimensional correlation modeling', Med Phys 43(8), 4643-4654.

Fallone, B. G., Murray, B., Rathee, S., Stanescu, T., Steciw, S., Vidakovic, S., Blosser, E. & Tymofichuk, D. (2009), 'First mr images obtained during megavoltage photon irradiation from a prototype integrated linac-mr system', Med Phys 36, 2084-2088.

Hewson, E. A., Nguyen, D. T., O'Brien, R., Kim, J., Montanaro, T., Moodie, T., Greer, P. B., Hardcastle, N., Eade, T., Kneebone, A., Hruby, G., Hayden, A. J., Turner, Sandra amd Siva, S., Tai, K., Hunter, P., Sams, J., Poulsen, P. R., Booth, J. T., Martin, J. T. & Keall, P. J. (2019), volume=46, number=11, pages=4125-4737, type=Journal Article,), 'The accuracy and precision of the kim motion monitoring system used in the multi-institutional TROG 15.01 stereotactic prostate ablative radiotherapy with kim (spark) trial', Medical Physics.

Kalman, R E. (1960), 'A new approach to linear filtering and prediction problems', Transactions of the ASME—Journal of Basic Engineering 82 (Series D), 35-45. Keall, P. J., Ng, J. A., Juneja, P., O'Brien, R T., Huang, C.-Y., Colvill, E., Caillet, V., Simpson, E., Poulsen, P. R., Kneebone, A., Eade, T. & Booth, J. T. (2016), 'Real-time 3d image guidance using a standard linac: Measured motion, accuracy, and precision of the first prospective clinical trial of kilovoltage intrafraction monitoring guided gating for prostate cancer radiation therapy', Int J Radiat Oncol Biol Phys 94(5), 1015-1021.

Keall, P. J., Ng, J. A., O'Brien, R., Colvill, E., Huang, C.-Y., Poulsen, P. R., Fledelius, W., Juneja, P., Simpson, E., Bell, L., Alfieri, F., Eade, T., Kneebone, A. & Booth, J. T. (2015), 'The first clinical treatment with kilovoltage intrafraction monitoring (kim): A real-time image guidance method', Med Phys 42, 354-358.

Keall, P., Nguyen, D. T., O'Brien, R., Booth, J. T., Greer, P., Poulsen, P. R., Gebski, V., Kneebone, A. & Martin, J. (2017), 'Stereotactic prostate adaptive radiotherapy utilising kilovoltage intrafraction monitoring: the trog 15.01 spark trial', BMC Cancer 17(180).

King, C. R., Brooks, J. D., Gill, H., Pawlicki, T., Cotrutz, C. & Presti, J. C. (2009), 'Stereotactic body radiotherapy for localized prostate cancer: Interim results of a prospective phase ii clinical trial', Int J Radiat Oncol Biol Phys 73(4), 1043-1048.

Kitamura, K., Shirato, H., Shimizu, S., Shinohara, N., Harabayashi, T., Shimizu, T., Kodama, Y., Endo, H., Onimaru, R., Nishioka, S., Aoyama, H., Tsuchiya, K. & Miyasaka, K. (2002), 'Registration accuracy and possible migration of internal fiducial gold marker implanted in prostate and liver treated with real-time tumor-tracking radiation therapy (rtrt)', Int J Radiat Oncol Biol Phys 62(3), 275-281.

Kupelian, P., Willoughby, T., Mahadevan, A., Djemil, T., Weinstein, G., Jani, S., Enke, C., Solberg, T., Flores, N., Liu, D., Beyer, D. & Levine, L. (2007), 'Multi-institutional clinical experience with the calypso system in localization and continuous, real-time monitoring of the prostate gland during external radiotherapy', Int J Radiat Oncol Biol Phys 67(4), 1088-1098.

Langen, K. M., Willoughby, T. R., Meeks, S. L., Santhanam, A., Cunningham, A., Levine, L. & Kupelian, P. A. (2008), 'Observations on real-time prostate gland motion using electromagnetic tracking', International journal of radiation oncology, biology, physics 71(4), 1084-1090.

Lovelock, D. M., Messineo, A. P., Cox, B. W., Kollmeier, M. A. & Zelefsky, M. J. (2014), 'Continuous monitoring and intrafraction target position correction during treatment improves target coverage for patients undergoing sbrt prostate therapy', International Journal of Radiation Oncology Biology Physics 91(3), 588-594.

Nguyen, D. T., Kim, J.-H., O'Brien, R T., Huang, C.-Y., Booth, J. T., Greer, P., Legge, K., Poulsen, P. R, Martin, J. & Keall, P. J. (2017), 'The first clinical implementation of a real-time six degree of freedom tracking system during radiation therapy', Radiother Oncol [In Press].

Poulsen, P. R, Cho, B. & Keall, P. (2008), 'A method to estimate mean position, motion magnitude, motion correlation, and trajectory of a tumor from cone-beam ct projections for image-guided radiotherapy', Int J Radiat Oncol Biol Phys 72(5), 1687-1596.

Poulsen, P. R, Cho, B. & Keall, P. (2009), 'Real-time prostate trajectory estimation with a single imager in arc radiotherapy: a simulation study', Physics in Medicine and Biology 54(13), 1687-1596.

Poulsen, P. R., Cho, B., Langen, K., Kupelian, P. & Keall, P. J. (2008a), 'Three-dimensional prostate position estimation with a single x-ray imager utilizing the spatial probability density', Phys Med Biol 53(16), 4331-4353.

Raaymakers, B. W., Lagendijk, J. J. W., Overweg, J., Kok, J. G. M., Raaijmakers, A. J. E., Kerkhof, E. M., Put, R. W. v. d., Meij sing, I., Crijns, S. P. M. & Benedosso, F. (2009), 'Integrating a 1.5 t mri scanner with a 6 my accelerator: proof of concept', Phys Med Biol 54, N229.

Robinson, D., Liu, D., Steciw, S., Field, C., Daly, H., Saibishkumar, E. P., Fallone, G., Parliament, M. & Amanie, J. (2012), 'An evaluation of the clarity 3d ultrasound system for prostate localization', Journal of applied clinical medical physics 13(4).

Santanam, L., Malinowski, K., Hubenshmidt, J., Dimmer, S., Mayse, M. L., Bradley, J., Chaudhari, A., Lechleiter, K., Goddu, S. K., Esthappan, J., Mutic, S., Low, D. A. & Parikh, P. (2008), 'Fiducial-based translational localization accuracy of electromagnetic tracking system and on-board kilovoltage imaging system', Int J Radiat Oncol Biol Phys 70(3), 892-899.

Sazawa, A., Shinohara, N., Harabayashi, T., Abe, T., Shirato, H. & Nonomura, K. (2009), 'Alternative approach in the treatment of adrenal metastasis with a real-time tracking radiotherapy in patients with hormone refractory prostate cancer.', Int J Urol. 16(4), 410-412.

Shimizu, S., Shirato, H., Kitamura, K., Shinohara, N., Harabayashi, T., Tsukamoto, T., Koyanagi, T. & Miyasaka, K. (2000), 'Use of an implanted marker and real-time tracking of the marker for the positioning of prostate and bladder cancers', International Journal of Radiation Oncology, Biology, Physics 48(5), 1591-1597.

Shirato, H., Harada, T., Harabayashi, T., Hida, K., Endo, H., Kitamura, K., Onimaru, R., Yamazaki, K., Kurauchi, N., Shimizu, T., Shinohara, N., Matsushita, M., Dosaka-Akita, H. & Miyasaka, K. (2003), 'Feasibility of insertion/implantation of 2.0-mm-diameter gold internal fiducial markers for precise setup and real-time tumor tracking in radiotherapy.', Int J Radiat Oncol Biol Phys 56(1), 240-247.

Shirato, H., Shimizu, S., Kunieda, T., Kitamura, K., van Herk, M., Kagei, K., Nishioka, T., Hashimoto, S., Fujita, K., Aoyama, H., Tsuchiya, K., Kudo, K. & Miyasaka, K. (2000), 'Physical aspects of a real-time tumor-tracking system for gated radiotherapy.', Int J Radiat Oncol Biol Phys 48(4), 1187-1195.

The claims defining the invention are as follows:

1. A method of estimating 3D target position during radiotherapy, the method comprising:
   acquiring one or more two-dimensional (2D) image positions of one or more treatment targets or one or more surrogates from a (kilovoltage) kV imager on a linear accelerator;
   implementing a Kalman filter framework using one or more computers to estimate a three-dimensional (3D) motion of the one or more treatment targets or the one or more surrogates from 2D image projection measurements in real-time during a radiotherapy treatment, wherein the Kalman filter is an iterative framework that allows for estimation of the measurement and estimation of a process error to be re-estimated from current and past measurements, wherein a population covariance of prostate motion is defined as:

$$Q_0 = Q_k = \begin{pmatrix} 0.3136 & 0.0114 & -0.0775 \\ 0.0114 & 1.8820 & 1.5051 \\ -0.0775 & 1.5051 & 2.4733 \end{pmatrix};$$

updating a target motion covariance with every image frame based on a last observed position of the one or more treatment targets or the one or more surrogates on a previous kV image; and
outputting to a display during the radiotherapy treatment the updated target motion.

2. The method of estimating 3D target position during radiotherapy according to claim 1, wherein the method is implemented during a prostate cancer treatment.

3. The method of estimating 3D target position during radiotherapy according to claim 2, further comprising:
   initializing an initial prostrate position of a patient on a day of treatment using image-guided radiation therapy;
   estimating a current position of the prostate based on information of motion distribution of prostate motion up to a last 2D image frame;
   estimating a current measurement error based on a previous distribution and expected distribution of prostate motion;
   re-estimating the current position of the prostate given current projection information; and
   estimating a posteriori covariance to be used for future prediction and update.

4. The method of estimating 3D target position during radiotherapy according to claim 1, further comprising:
   initializing an initial position of the one or more treatment targets of a patient on a day of treatment using image-guided radiation therapy;
   estimating a current position of the one or more treatment targets based on information of motion distribution of target motion up to a last 2D image frame;
   estimating a current measurement error based on a previous distribution and expected distribution of target motion;
   re-estimating the current position of the one or more treatment targets given current projection information; and
   estimating a posteriori covariance to be used for future prediction and update.

5. A method of monitoring movement of an organ or portion of an organ or one or more surrogates of the organ during irradiation, comprising:
   directing radiation energy at, at least a portion of an organ in a body part of a human or an animal subject;
   imaging multiple two dimensional images of the organ from varying positions and varying angles relative to the body part;
   digitally processing at least a plurality of the multiple two dimensional images using a one or more computers with a software application running a Kalman filter algorithm, wherein the digital processing is initialized with a population covariance matrix of prostate motion defined as $$Q_0 = Q_k = \begin{pmatrix} 0.3136 & 0.0114 & -0.0775 \\ 0.0114 & 1.8820 & 1.5051 \\ -0.0775 & 1.5051 & 2.4733 \end{pmatrix}; \text{ and}$$

displaying estimated three dimensional motion of the organ or portion of the organ in the body part based on output from the digital processing.

6. The method of claim 5 wherein the multiple two dimensional images are obtained using a linear accelerator gantry mounted kilovoltage x-ray imager system.

7. The method of claim 5, further comprising:
initializing the digital processing with a population covariance matrix so as to avoid a learning period.

8. The method of claim 5 wherein the organ is a prostate of a human subject, and wherein the body part is a pelvis of the human.

\* \* \* \* \*